(12) United States Patent
Little

(10) Patent No.: US 11,693,117 B2
(45) Date of Patent: Jul. 4, 2023

(54) GEIGER-MODE LASER VIBROMETRY METHODS AND SYSTEMS

(71) Applicant: Lawrence Livermore National Security, LLC, Livermore, CA (US)

(72) Inventor: Liesl M. Little, Livermore, CA (US)

(73) Assignee: LAWRENCE LIVERMORE NATIONAL SECURITY, LLC, Livermore, CA (US)

( * ) Notice: Subject to any disclaimer, the term of this patent is extended or adjusted under 35 U.S.C. 154(b) by 456 days.

(21) Appl. No.: 16/841,656

(22) Filed: Apr. 6, 2020

(65) Prior Publication Data

US 2020/0326424 A1    Oct. 15, 2020

Related U.S. Application Data

(60) Provisional application No. 62/832,512, filed on Apr. 11, 2019.

(51) Int. Cl.
*G01S 7/481* (2006.01)
*G01S 17/58* (2006.01)
*G01S 17/88* (2006.01)
*G01S 7/48* (2006.01)

(52) U.S. Cl.
CPC ............ *G01S 17/58* (2013.01); *G01S 7/4802* (2013.01); *G01S 17/88* (2013.01)

(58) Field of Classification Search
CPC ......... G01S 17/58; G01S 7/4802; G01S 17/88
See application file for complete search history.

(56) References Cited

U.S. PATENT DOCUMENTS

| 2007/0166049 A1* | 7/2007 | Pearson | G01H 9/00 398/161 |
| 2017/0135581 A1* | 5/2017 | Blodgett | A61B 5/4064 |
| 2018/0259645 A1* | 9/2018 | Shu | G01S 17/42 |
| 2018/0306926 A1* | 10/2018 | LaChapelle | G01J 1/44 |

OTHER PUBLICATIONS

Jiang and Luu, "Heterodyne detection with a weak local oscillator," Applied Optics, vol. 47, No. 10, Apr. 1, 2008.
Luu and Jiang, "Saturation effects in heterodyne detection with Geiger-mode InGaAs avalanche photodiode detector arrays," Applied Optics, vol. 45, No. 16, Jun. 1, 2006.

* cited by examiner

*Primary Examiner* — Mohamed Charioui
*Assistant Examiner* — Christine Y Liao
(74) *Attorney, Agent, or Firm* — Perkins Coie LLP

(57) ABSTRACT

Systems and methods for Geiger-mode laser vibrometry are described. An example method for laser vibrometry includes receiving a first time-series of single photon arrivals corresponding to a laser beam reflected from or transmitted through a target, the single photon arrivals including information corresponding to vibrations of the target, each single photon arrival separated in time from another single photon arrival, determining, based on two or more of the single photon arrivals, a discrete time sequence having a binary value, and generating a second time-series by assigning a non-binary value to each of the discrete time points, wherein each of the assigned non-binary values is determined based on a number of discrete time points lacking a photon arrival prior to receiving a photon.

20 Claims, 5 Drawing Sheets

GEIGER-MODE LASER VIBROMETRY METHODS AND SYSTEMS

CROSS-REFERENCE TO RELATED APPLICATION

This patent document claims priority to and benefits of U.S. Provisional Patent Application No. 62/832,512 entitled "GEIGER-MODE LASER VIBROMETRY METHODS AND SYSTEMS" and filed Apr. 11, 2019. The entire contents of the before-mentioned patent application is incorporated by reference as part of the disclosure of this patent document.

STATEMENT REGARDING FEDERALLY SPONSORED RESEARCH OR DEVELOPMENT

The United States Government has rights in this invention pursuant to Contract No. DE-AC52-07NA27344 between the U.S. Department of Energy and Lawrence Livermore National Security, LLC, for the operation of Lawrence Livermore National Laboratory.

TECHNICAL FIELD

This document generally relates to optical systems, and more particularly to laser vibrometry methods and systems.

BACKGROUND

Laser vibrometry observes vibration by measuring surface displacement through its impact on the phase of an incident laser beam. The laser beam from a laser vibrometry system is directed at the surface of interest, and the vibration amplitude and frequency are extracted from the Doppler shift of the reflected laser beam frequency due to the motion of the surface. The output of a laser vibrometry system is generally a continuous analog voltage that is directly proportional to the target velocity component along the direction of the laser beam.

Some advantages of a laser vibrometry system over similar measurement devices such as an accelerometer are that the laser vibrometry system can be directed at targets that are difficult to access, or that may be too small or too hot to attach a physical transducer.

SUMMARY

The disclosed systems, devices and methods relate to Geiger-mode laser vibrometry that allow measurement of small vibrations.

In one aspect, the disclosed technology provides a method for laser vibrometry, comprising receiving a first time-series of single photon arrivals corresponding to a laser beam reflected from or transmitted through a target, the single photon arrivals including information corresponding to vibrations of the target, each single photon arrival separated in time from another single photon arrival, determining, based on two or more of the single photon arrivals, a discrete time sequence having a binary value, wherein a first binary value is indicative of an arrival and a second binary value is indicative of a lack of an arrival of a photon at a corresponding discrete time point, and generating a second time-series by assigning a non-binary value to each of the discrete time points, wherein each of the assigned non-binary values is determined based on a number of discrete time points lacking a photon arrival prior to receiving a photon, wherein processing the second time-series enables extraction of the information corresponding to vibrations of the target.

In another aspect, the disclosed technology provides a device for laser vibrometry, comprising a splitter to split an input laser beam into a first laser beam and a second laser beam, a first optical component positioned to direct the first laser beam toward a target, a second optical element positioned to receive a laser beam that is either reflected from, or transmitted through, the target, the reflected or the transmitted laser beam comprising single photon arrivals that include information corresponding to vibrations of the target, each single photon arrival separated in time from another single photon arrival, an avalanche photodiode (APD) array positioned to receive and to detect the single photon arrivals, and a processor, coupled to the APD array, that is configured to receive detection information as part of a first time-series corresponding to the single photon arrivals, determine, based on two or more of the single photon arrivals, a discrete time sequence having a binary value, wherein a first binary value is indicative of an arrival and a second binary value is indicative of a lack of an arrival of a photon at a corresponding discrete time point, and generate a second time-series by assigning a nonbinary value to each of the discrete time points, wherein each of the assigned non-binary values is determined based on a number discrete time points lacking a photon arrival prior to receiving a photon, and wherein processing the second time-series enables extraction of the information corresponding to vibrations of the target.

In yet another aspect, an apparatus comprising a memory and a processor implements the above-described method is disclosed.

In yet another aspect, the method may be embodied as processor-executable code and may be stored on a non-transitory computer-readable program medium.

The above and other aspects and features of the disclosed technology are described in greater detail in the drawings, the description and the claims.

DETAILED DESCRIPTION

Figure 1:
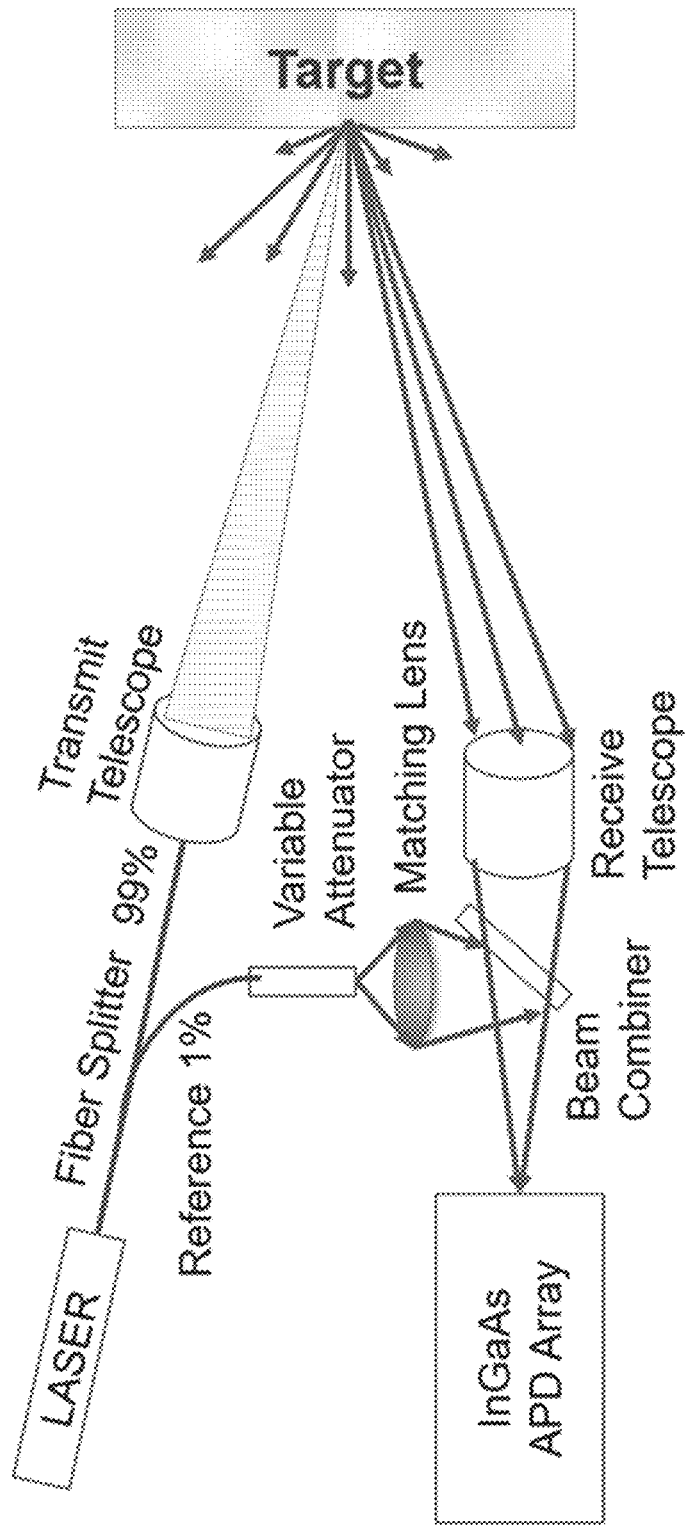
FIG. 1 is a block diagram of an example configuration illustrating laser vibrometry operation.

Detection of the Doppler frequency shift that occurs when light is scattered by a moving surface is the basis of laser Doppler vibrometry (LDV). This frequency shift is directly proportional to the surface velocity and so its detection enables convenient and non-contact measurement of vibration velocity. Detection is not entirely straightforward as the laser has a frequency that is typically six or seven orders of magnitude higher than the Doppler shifts, which are typically in the low MHz range. Scattered light from the target has to be mixed interferometrically with a mutually coherent reference beam that has been frequency shifted to produce a beat in the collected light intensity at the difference in frequency between the target and reference beams, i.e. down in the MHz range where demodulation is electronically possible.

Most laser vibrometers use a heterodyne approach to measure phase with an interferometric technique (coherent detection), where light reflected from a target is mixed with a reference beam at a different frequency. This produces a carrier at an intermediate frequency (IF) appropriately matched to the detector. The signal of interest is the phase modulation of this IF carrier, produced by vibration on the surface of the sampled target. One of the most common and effective methods to determine the phase is the use of I/Q demodulation. This phase calculation is dependent on a varying amplitude in the IF carrier, which is generally quite small because the measured displacements are small, making the amplitude of the signal much lower than the IF carrier amplitude and thus driving the requirement for high carrier-to-noise ratio (CNR). The high CNR requirement generally limits the range of laser vibrometers. Research systems have used higher powers to extend the range but are hampered by limitations on available power in portable laser systems and by noise and dynamic range in the detectors, as well as by eye-safety concerns for some applications.

A single-photon avalanche diode (SPAD) is a solid-state photodetector in which a photon-generated carrier (via the internal photoelectric effect) can trigger a short-duration but relatively large avalanche current. SPADs, like avalanche photodiodes (APDs), exploit the incident radiation triggered avalanche current of a p-n junction when reverse biased. The difference between SPADs and APDs is that SPADs are specifically designed to operate with a reverse-bias voltage well above the breakdown voltage. This kind of operation is also called Geiger-mode in the literature (as opposed to the linear-mode for the case of an APD). This is in analogy with the Geiger counter. Single-photon counting (or Geiger-mode) detectors excel when there is a need for very high time resolution and good performance at low light intensities.

In direct detection, signals can be measured at the single-photon level using Geiger-mode avalanche photodiode (GMAPD) detectors, which provide low noise and high amplification. The ability to extend the use of GMAPD detectors to coherent detection would enable extending the range of laser vibrometers. However, the signal from a GMAPD is fundamentally different than that from a linear detector. With a GMAPD, the signal is binary: either a photon arrived within a time sample or it did not. The signal detection is additionally complicated by the dead time in the detector; once a photon has been detected, no more photons can be detected until the detector is reset. In some embodiments, the dead time can be reduced but not eliminated using either a passive quenching circuit (which includes a single resistor in series with the GMPAD) or an active quenching circuit (which includes a fast discriminator that senses the steep onset of the avalanche current across a resistor (or integrated transistor) and provides a digital output pulse, synchronous with the photon arrival time, and then quickly reduces the bias voltage to below breakdown, then relatively quickly returns bias to above the breakdown voltage ready to sense the next photon).

Recently, GMAPD arrays have become commercially available. GMAPD arrays provide the ability to compensate for detector dead time. While the individual detector cells in the array will still experience dead time after a detection, other detector cells remain available for later photon arrivals, as long as the signal avoids detector saturation levels. This application of the array does not produce an image. Existing implementations have used this effect in a laboratory demonstration of coherent detection with a GMAPD array, which showed a Doppler shift with a signal modulated by a single narrow frequency. While the detector array provides an approach for handling detector dead time, the signal remains binary. An IF carrier detected coherently by a GMAPD does not exhibit amplitude variation. Instead, the aggregate photon-arrival time signal from the array contains periodically "bunched" detections. Such a signal is not compatible with traditional I/Q demodulation which depends on linear amplitude variations. Other existing implementations have recovered a linear Doppler shift (not a sinusoidal vibration) by calculating the power spectral density of the time histogram of photon arrivals and observing the change in carrier peak location. This approach is suitable for a large linear Doppler shift with a single velocity component, but not for the small vibration signals with complex spectral content that are commonly seen in surface measurements.

FIG. 1 is a block diagram illustrating laser vibrometry operation in accordance with an example embodiment. As illustrated therein, an output of a laser source is split into a main path (denoted 99%) and a reference path (denoted 1%), using, for example, a fiber splitter. The main beam is transmitted onto a target using, for example, a telescope. The incident beam reflects from the target and is received by the receiving optics, such as a receive telescope. The received laser signal is then combined with the reference beam (after passing through a matching a lens) using a beam combiner. The combined received beam and reference beam are incident on a detector array, such as an InGaAs APD array, that can detect single photon events.

In a traditional heterodyne system, the reference beam is much stronger than the signal beam. The purpose of this disparity is to maximize the signal-to-noise ratio (SNR) by making the shot noise of the reference dominate any detector noise. Such an approach would instantly saturate a photon-counting coherent detector. However, in the photon-counting regime, the coherently mixed signal can utilize a secondary optimization that reduces the reference level to be approximately equal to the signal (which generally requires an attenuator on the reference). In this low-noise regime, matched light levels result in the strongest detected carrier. In some embodiments, a matching lens (as illustrated in FIG. 1) is used to match the phase front shapes of the reference and signal beams.

Although FIG. 1 illustrates an example of a single-point laser vibrometer, embodiments of the disclosed technology are equally applicable to other laser vibrometers that include, but are not limited to, scanning vibrometers (which add scanning mirrors to allow the laser to be moved across a surface), 3-D vibrometers (which uses three independent beams to determine complete in-plane and out-of-plane velocity), rotational vibrometers (to measure rotational or angular velocity) and differential vibrometers (to measure the out-of-plane velocity difference between two locations on the target).

In some embodiments, the GMAPD array comprises 32×128 pixels, and operates as a single detector to compensate for the dead time after a detection for each individual APD detector. In an example, a photon-counting array with 32×32 elements features sub-nanosecond timing resolution and integrated digital readout circuits. In another example, larger-format arrays such as 64×64, 128×128 and 16×256 or larger may be used. These detectors offer a practical and scalable architecture for building Geiger-mode heterodyne receivers. In an example, the GMAPD array illustrated in FIG. 1 is a Falcon-II 128×32 Geiger-Mode Flash 3-D LiDAR Camera, wherein each of the 128×32 pixels is capable of detecting a single photon to within 250 ps resolution, and is capable of collecting 400 million pixel measurement returns per second.

The laser vibrometer illustrated in FIG. 1 illustrates a reflective configuration with the laser from the transmit telescope reflecting off the target to the receive telescope. Embodiments of the disclosed technology are applicable to vibrometers that may operate in transmission, where the receive telescope is located on the other side of the target from the transmit telescope to capture the portion of the laser that is transmitted or refracted through the target. Other embodiments are also applicable to vibrometers that may operate in a monostatic configuration (sharing transmit and receive optics) as opposed to the bistatic configuration (separate transmit and receive optics, as illustrated in FIG. 1).

For coherent detection using a linear detector, the detector output is an analog waveform at the carrier frequency with phase that is modulated by the target's surface vibration. Typically, this output is digitized to provide an amplitude as a function of time and then mixed digitally with two digitized references whose amplitudes are the same but whose phase is shifted by 90. This approach, called I/Q demodulation, can be used to calculate the phase of the carrier. Standard signal processing techniques applied to the phase, such as FFTs, allow observation of the vibration spectrum of the target vibration.

In some embodiments, the target vibrations may be ascertained by processing the "beating" pattern that results from the reference and sample beams have different frequencies due to the sample beam being Doppler shifted after reflecting off of the target.

For coherent detection with GMAPDs, the detector output is a binary record of the received photons at discrete points in time (i.e., a time-series). The amplitude of this signal has only two values—either "high", which is a digital one, or "low", which is a digital zero. Such a signal lacks a varying amplitude and therefore cannot be used to calculate the phase. However, the photon arrival times do vary at the carrier frequency, and similarly those arrival times experience modulation imposed by the phase change at the target reflection.

Figure 2A:
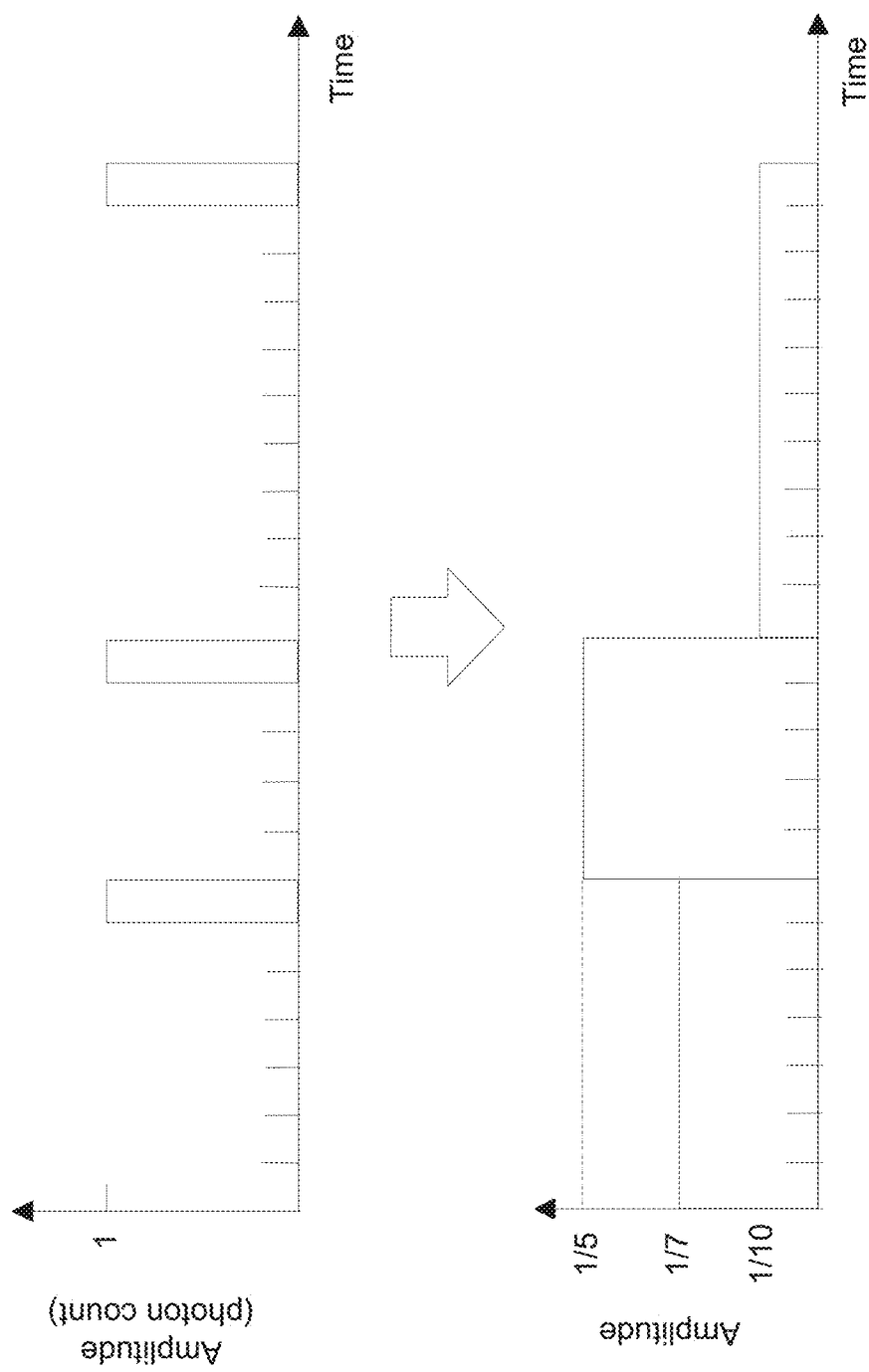
FIG. 2A illustrates an example of a method of processing the signals received by a Geiger-mode avalanche detector.

Embodiments of the disclosed technology bridge this gap between the inherently binary output of the GMAPD array and the digitized analog function needed to separate the carrier from the signal and fold the photon arrival times into an amplitude as a function of time. In some embodiments, this is implemented by averaging the detector output for each photon across any preceding bins with no photons, e.g., since a received photon results in an output of "1" for the receiving time bin, if that full bin was preceded by N empty bins, the value in each of those N bins (including the one with the photon) can be computed using $1/(N+1)$, as illustrated in FIG. 2A. This results in a step-wise sinusoidal function that can be digitally mixed with the sampled reference.

Figure 2B:
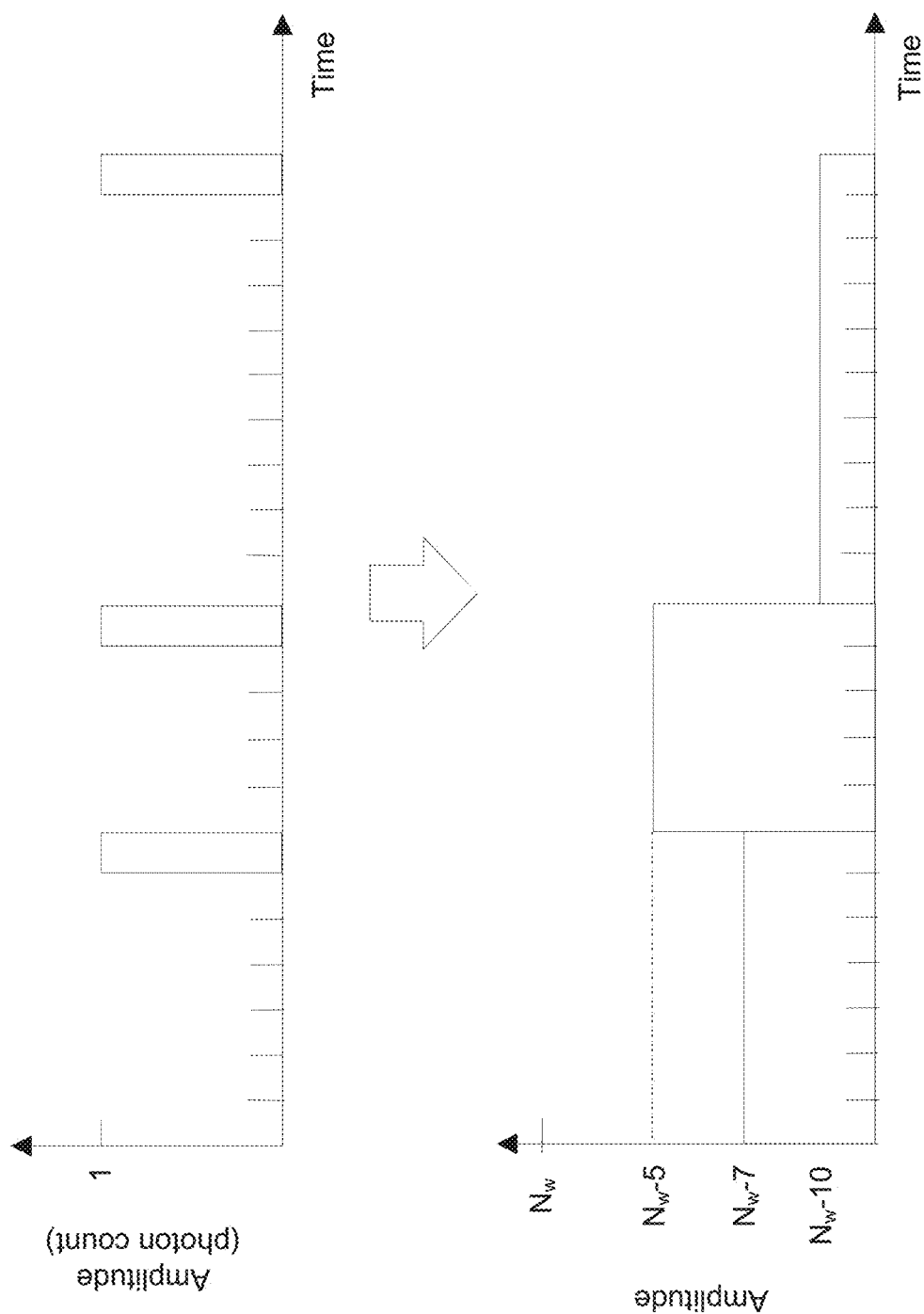
FIG. 2B illustrates an example of another method of processing the signals received by a Geiger-mode avalanche detector.

In another embodiment, as illustrated in FIG. 2B, the value in each of those N bins (including the one with the photon) can be computed based on the number of preceding empty bins and a total number of bins over a predetermined duration (or window, and denoted $N_W$). As illustrated therein, the amplitudes of the bins that correspond to the 7, 5 and 10 preceding empty bins is set to $(N_W-7)$, $(N_W-5)$ and $(N_W-10)$, respectively, which improves the linearization as compared to the $1/(N+1)$ averaging illustrated in the context of FIG. 2A.

While different from pulse-width-modulation (PWM), this stepped function may be analogized in some respects to a PWM sine-wave generator. In PWM, the digital output is a square pulse whose fractional duty cycle is the desired fractional amplitude (where the peak value is one) for that time sample. PWM is also a means of translating a binary signal to an amplitude as a function of time. However, it differs from the embodiments described herein at least in that the step periods vary with time, whereas the PWM steps have a constant width. Mixing the generated stepped sinusoid with the sampled reference enables the separation of the carrier from the signal of interest. This will advantageously enable the use of high-sensitivity, low-noise GMAPD arrays for the non-contact laser-based measurement of vibration displacement (as opposed to Doppler shift from velocity).

The embodiment illustrated in FIG. 2A uses a "averaging window" that extends from the previous photon arrival to the current photon arrival and implements a uniform distribution, e.g. the value is $1/(N+1)$ with a photon arriving in the Nth bin. Embodiments of the disclosed technology include variations for folding the photon arrival time into an amplitude as a function of time. For example, in some embodiments, the averaging window may be centered on the current photon arrival, and therefore include bins that are both before and after the current photon arrival. In other embodiments, the uniform distribution may be replaced by a different distribution. For example, an exponential distribution ($\lambda e^{-\lambda x}$) may be used with its parameter ($\lambda$) being a function of the number of preceding empty bins (N). In yet other embodiments, the averaging window for each photon arrivals is overlapped with the averaging windows for the preceding and subsequent photon arrivals.

In yet other embodiments, the uniform distributions illustrated in FIGS. 2A and 2B may be further processed to reduce or eliminate the discontinuities in the step-wise sinusoidal function, which is then digitally mixed with the sampled reference. For example, a piece-wise linear function may be used over each set of preceding bins to provide the smoothing operation. In another example, a spline function may be used to determine the values in each of the preceding bins.

Figure 3:
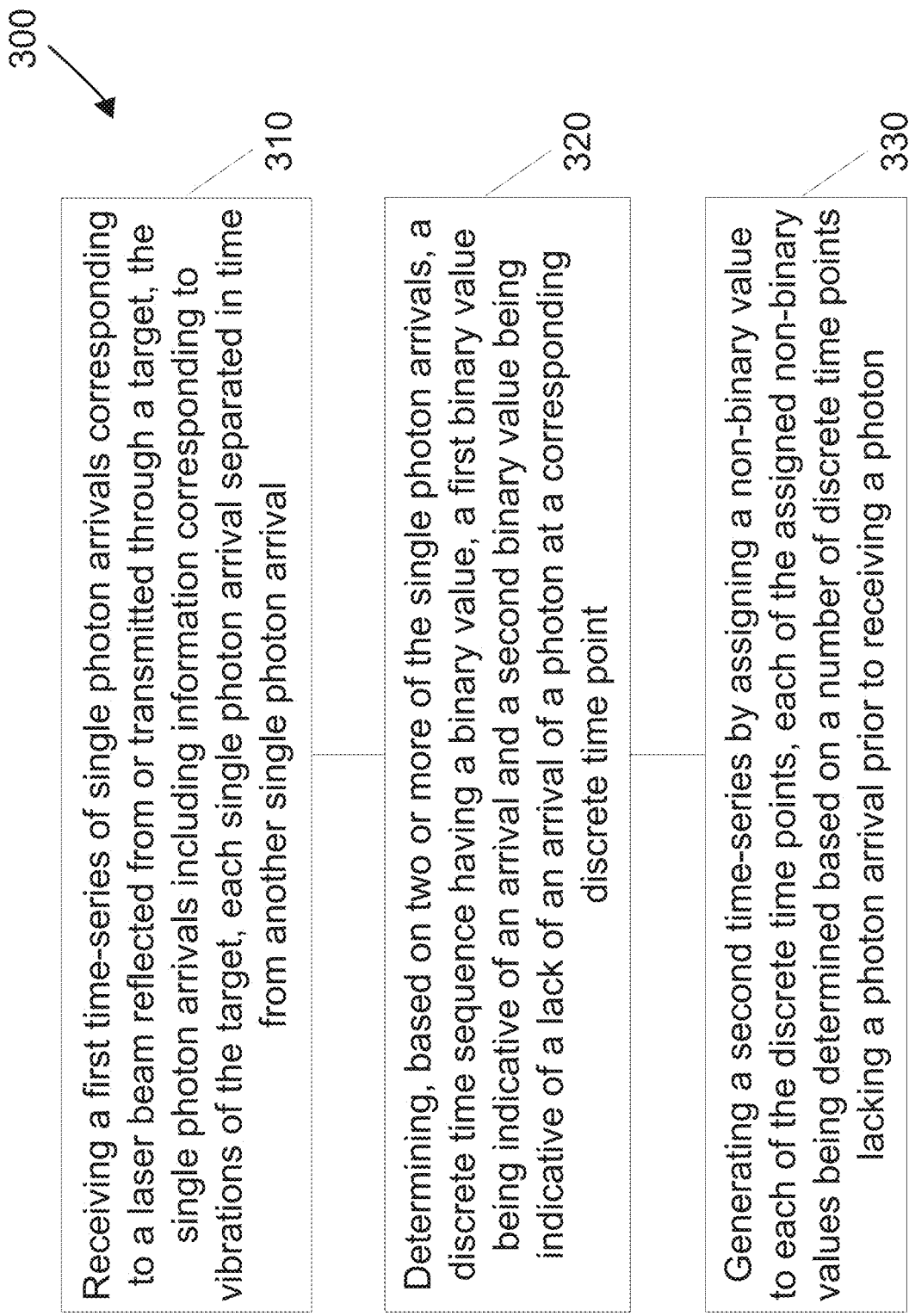
FIG. 3 is a flowchart of an example method for Geiger-mode laser vibrometry.

FIG. 3 is a flowchart of an example method for Geiger-mode laser vibrometry. The method 300 includes, at operation 310, receiving a first time-series of single photon arrivals corresponding to a laser beam reflected from or transmitted through a target, the single photon arrivals including information corresponding to vibrations of the target, each single photon arrival separated in time from another single photon arrival.

The method 300 includes, at operation 320, determining, based on two or more of the single photon arrivals, a discrete time sequence having a binary value, a first binary value being indicative of an arrival and a second binary value being indicative of a lack of an arrival of a photon at a corresponding discrete time point.

The method 300 includes, at operation 330, generating a second time-series by assigning a non-binary value to each of the discrete time points, each of the assigned non-binary values being determined based on a number of discrete time points lacking a photon arrival prior to receiving a photon.

In some embodiments, processing the second time-series enables extraction of the information corresponding to vibrations of the target.

In some embodiments, each of the assigned non-binary values is determined based at least in-part on a separation of the two or more of the single photon arrivals and an average value of the number of discrete time points between consecutive photon arrivals.

In some embodiments, each of the assigned non-binary values is determined based at least in-part on subtracting the number of discrete time points lacking the photon arrival prior to receiving the photon from a predetermined duration of the discrete time sequence.

In some embodiments, the assigned non-binary values are determined based on a linear interpolation over the number of discrete time points between consecutive photon arrivals.

In some embodiments, the method 300 further comprises the operation of generating the first time-series of single photon arrivals by combining a reference laser beam with the laser beam reflected from the target.

In some embodiments, the combining is performed using a beam combiner.

In some embodiments, the second time-series forms a step-wise signal approximating a sinusoidal signal.

In some embodiments, the method 300 further comprises the operation of determining a value associated with the vibrations of the target.

Embodiments of the disclosed technology further include a device for laser vibrometry, comprising a splitter to split an input laser beam into a first laser beam and a second laser beam, a first optical component positioned to direct the first laser beam toward a target, a second optical element positioned to receive a laser beam that is either reflected from, or transmitted through, the target, the reflected or the transmitted laser beam comprising single photon arrivals that include information corresponding to vibrations of the target, each single photon arrival separated in time from another single photon arrival, an avalanche photodiode (APD) array positioned to receive and to detect the single photon arrivals, and a processor, coupled to the APD array, that is configured to receive detection information as part of a first time-series corresponding to the single photon arrivals, determine, based on two or more of the single photon arrivals, a discrete time sequence having a binary value, wherein a first binary value is indicative of an arrival and a second binary value is indicative of a lack of an arrival of a photon at a corresponding discrete time point, and generate a second time-series by assigning a nonbinary value to each of the discrete time points, wherein each of the assigned non-binary values is determined based on a number discrete time points lacking a photon arrival prior to receiving a photon, and wherein processing the second time-series enables extraction of the information corresponding to vibrations of the target.

In some embodiments, the device further comprises a laser source, coupled to the splitter, to emit the input laser beam.

In some embodiments, the device further comprises a beam combiner to combine the second laser beam with the reflected or the transmitted laser beam.

In some embodiments, the APD array comprises an indium gallium arsenide (InGaAs) array or a plurality of Geiger-mode APD detectors.

In some embodiments, each of the assigned non-binary values is determined based at least in-part on a separation of the two or more of the single photon arrivals and an average value of the number of discrete time points between consecutive photon arrivals.

In some embodiments, each of the assigned non-binary values is determined based on a spline function over the number of discrete time points between consecutive photon arrivals.

Embodiments of the disclosed technology further include non-transitory computer-readable storage medium having instructions stored thereupon for laser vibrometry, comprising instructions for receiving a first time-series of single photon arrivals corresponding to a laser beam reflected from or transmitted through a target, the single photon arrivals including information corresponding to vibrations of the target, each single photon arrival separated in time from another single photon arrival, instructions for determining, based on two or more of the single photon arrivals, a discrete time sequence having a binary value, wherein a first binary value is indicative of an arrival and a second binary value is indicative of a lack of an arrival of a photon at a corresponding discrete time point, and instructions for generating a second time-series by assigning a non-binary value to each of the discrete time points, wherein each of the assigned non-binary values is determined based on a number of discrete time points lacking a photon arrival prior to receiving a photon, wherein processing the second time-series enables extraction of the information corresponding to vibrations of the target.

Embodiments of the disclosed technology further include another method for laser vibrometry comprising receiving a first time series of single photon arrivals corresponding to a laser beam reflected from a target, the single photon arrivals including information corresponding to vibrations of the target, each single photon arrival separated in time from another single photon arrival, determining separations between the signal photon arrivals to form a discrete time sequence having a binary value, each binary value indicative of an arrival or a lack of an arrival of a photon at a corresponding discrete time point, generating a second time-series by assigning a non-zero value to each of the discrete time points, wherein each of the assigned non-zero values is determined based on a number discrete time points lacking a photon arrival prior to receiving a photon, and processing the second time-series to extract the information corresponding to vibrations of the target.

In some embodiments, the assigned non-zero values are determined based on an average value of the number of discrete time points between consecutive photon arrivals.

In some embodiments, the method further comprises generating the first time-series of single photon arrivals by combining a reference laser beam with the laser beam reflected from the target.

In some embodiments, the combining is performed using a beam combiner.

In some embodiments, the second time series forms a step-wise signal approximating a sinusoidal signal.

In some embodiments, the method further comprises determining a value associated with the vibrations.

Embodiments of the disclosed technology further include another device for laser vibrometry comprising a device for improving laser vibrometry, comprising a laser source to emit a laser beam, a splitter, coupled to the laser source, to split the laser beam into a first laser beam and a second laser beam, a transmit optical element to transmit the first laser beam toward a target, a receive optical element to receive a reflected laser beam from the target, the reflected laser beam comprising single photon arrivals that include information corresponding to vibrations of the target, each single photon arrival separated in time from another single photon arrival, an avalanche photodiode (APD) array to detect the single photon arrivals, and a processor, coupled to the APD array, that is configured to receive a first time series corresponding to the single photon arrivals, determine separations between the received signal photon arrivals to form a discrete time sequence having a binary value, each binary value indicative of an arrival or a lack of an arrival of a photon at a corresponding discrete time point, generate a second time-series by assigning a non-zero value to each of the discrete time points, wherein each of the assigned non-zero values is determined based on a number discrete time points lacking a photon arrival prior to receiving a photon, and processing the second time-series to extract the information corresponding to vibrations of the target.

In some embodiments, the device further comprises a beam combiner to combine the second laser beam and the reflected laser beam.

Figure 4:
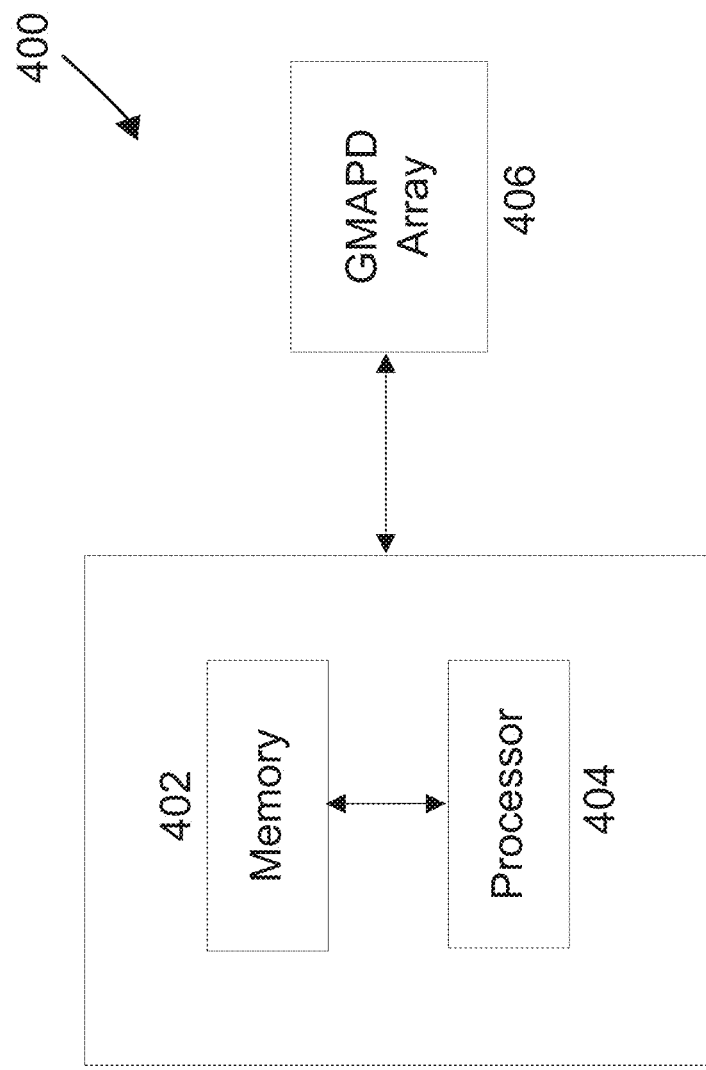
FIG. 4 illustrates an example hardware apparatus to implement various aspects of a laser vibrometry system, in accordance with the disclosed technology.

FIG. 4 is a block diagram of an example hardware apparatus (which includes the illustrated electrical and processing hardware and optical hardware that is not shown in FIG. 4) that can accommodate at least some of the disclosed technology. The apparatus 400 may be implemented in a fixed or mobile framework to enable laser vibrometry in both the laboratory and in the field. The apparatus 400 may include one or more processors 402, one or more memories 404 and a GMAPD array 406. The processor(s) 402 may be configured to implement one or more methods (including, but not limited to, method 300) described in the present document. The memory (memories) 404 may be used for storing data and code used for implementing the methods and techniques described herein. The GMAPD array 406 is coupled to the processor 402 and/or the memory 404 and can receive commands and signals from the processor; the GMAPD array 406 may also transmit signals including data and commands to the processor 402 and/or memory 404.

At least some of the implementations of the subject matter and the functional operations described in this patent document can be implemented in various systems, digital electronic circuitry, or in computer software, firmware, or hardware, including the structures disclosed in this specification and their structural equivalents, or in combinations of one or more of them. At least some of the disclosed embodiments can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method for laser vibrometry, comprising:
receiving, using a photodiode configured to operate in a Geiger mode, a first time-series of single photon arrivals corresponding to a laser beam reflected from or transmitted through a target, the single photon arrivals including information corresponding to vibrations of the target, each single photon arrival separated in time from another single photon arrival;
determining, based on two or more of the single photon arrivals, a discrete time sequence having a binary value, wherein a first binary value is indicative of an arrival and a second binary value is indicative of a lack of an arrival of a photon at a corresponding discrete time point; and
generating a second time-series by assigning a non-binary value to each of the discrete time points, wherein each of the assigned non-binary values corresponding to the second binary values represents a separation between two of the two or more of the single photon arrivals that is determined based on a number of discrete time points lacking a photon arrival prior to receiving a photon,
wherein processing the second time-series enables extraction of the information corresponding to vibrations of the target.

2. The method of claim 1, wherein each of the assigned non-binary values is determined based at least in-part on an average value of the number of discrete time points between consecutive photon arrivals.

3. The method of claim 1, wherein each of the assigned non-binary values is determined based at least in-part on subtracting the number of discrete time points lacking the photon arrival prior to receiving the photon from a predetermined duration of the discrete time sequence.

4. The method of claim 1, wherein the assigned non-binary values are determined based on a linear interpolation over the number of discrete time points between consecutive photon arrivals.

5. The method of claim 1, further comprising:
generating the first time-series of single photon arrivals by combining a reference laser beam with the laser beam reflected from the target, wherein the reference laser beam is weaker than the laser beam that illuminates the target.

6. The method of claim 5, wherein the combining is performed using a beam combiner.

7. The method of claim 1, wherein the second time-series forms a step-wise signal approximating a sinusoidal signal.

8. The method of claim 1, comprising determining a value associated with the vibrations of the target.

9. A device for laser vibrometry, comprising:
a splitter to split an input laser beam into a first laser beam and a second laser beam;
a first optical component positioned to direct the first laser beam toward a target;
a second optical element positioned to receive a laser beam that is either reflected from, or transmitted through, the target, the reflected or the transmitted laser beam comprising single photon arrivals that include information corresponding to vibrations of the target, each single photon arrival separated in time from another single photon arrival;
an avalanche photodiode (APD) array configured to operate in a Geiger mode and positioned to receive and to detect the single photon arrivals; and
a processor, coupled to the APD array, that is configured to:
receive detection information as part of a first time-series corresponding to the single photon arrivals;
determine, based on two or more of the single photon arrivals, a discrete time sequence having a binary value, wherein a first binary value is indicative of an arrival and a second binary value is indicative of a lack of an arrival of a photon at a corresponding discrete time point; and
generate a second time-series by assigning a nonbinary value to each of the discrete time points, wherein each of the assigned non-binary values corresponding to the second binary values represents a separation between two of the two or more of the single photon arrivals that is determined based on a number of discrete time points lacking a photon arrival prior to receiving a photon, and wherein processing the second time-series enables extraction of the information corresponding to vibrations of the target.

10. The device of claim 9, further comprising:
a laser source, coupled to the splitter, to emit the input laser beam.

11. The device of claim 9, further comprising:
a beam combiner to combine the second laser beam with the reflected or the transmitted laser beam, wherein the second laser beam is a reference beam that is weaker than the first laser beam.

12. The device of claim 9, wherein the APD array comprises an indium gallium arsenide (InGaAs) array or a plurality of Geiger-mode APD detectors.

13. The device of claim 9, wherein each of the assigned non-binary values is determined based at least in-part on an average value of the number of discrete time points between consecutive photon arrivals.

14. The device of claim 9, wherein each of the assigned non-binary values is determined based on a spline function over the number of discrete time points between consecutive photon arrivals.

15. A non-transitory computer-readable storage medium having instructions stored thereupon for laser vibrometry, comprising:
instructions for receiving, using a photodiode configured to operate in a Geiger mode, a first time-series of single photon arrivals corresponding to a laser beam reflected from or transmitted through a target, the single photon arrivals including information corresponding to vibrations of the target, each single photon arrival separated in time from another single photon arrival;
instructions for determining, based on two or more of the single photon arrivals, a discrete time sequence having a binary value, wherein a first binary value is indicative of an arrival and a second binary value is indicative of a lack of an arrival of a photon at a corresponding discrete time point; and
instructions for generating a second time-series by assigning a non-binary value to each of the discrete time points, wherein each of the assigned non-binary values corresponding to the second binary values represents a separation between two of the two or more of the single photon arrivals that is determined based on a number of discrete time points lacking a photon arrival prior to receiving a photon,
wherein processing the second time-series enables extraction of the information corresponding to vibrations of the target.

16. The non-transitory computer-readable storage medium of claim 15, wherein each of the assigned non-binary values is determined further based at least in-part on an average value of the number of discrete time points between consecutive photon arrivals.

17. The non-transitory computer-readable storage medium of claim 15, wherein each of the assigned non-binary values is determined based at least in-part on subtracting the number of discrete time points lacking the photon arrival prior to receiving the photon from a predetermined duration of the discrete time sequence.

18. The non-transitory computer-readable storage medium of claim 15, further comprising:
 instructions for generating the first time-series of single photon arrivals by combining a reference laser beam with the laser beam reflected from the target, wherein the reference laser beam is weaker than the laser beam that illuminates the target.

19. The non-transitory computer-readable storage medium of claim 18, wherein the combining is performed using a beam combiner.

20. The non-transitory computer-readable storage medium of claim 15, comprising:
 instructions for determining a value associated with the vibrations of the target.

* * * * *